Figure 1:
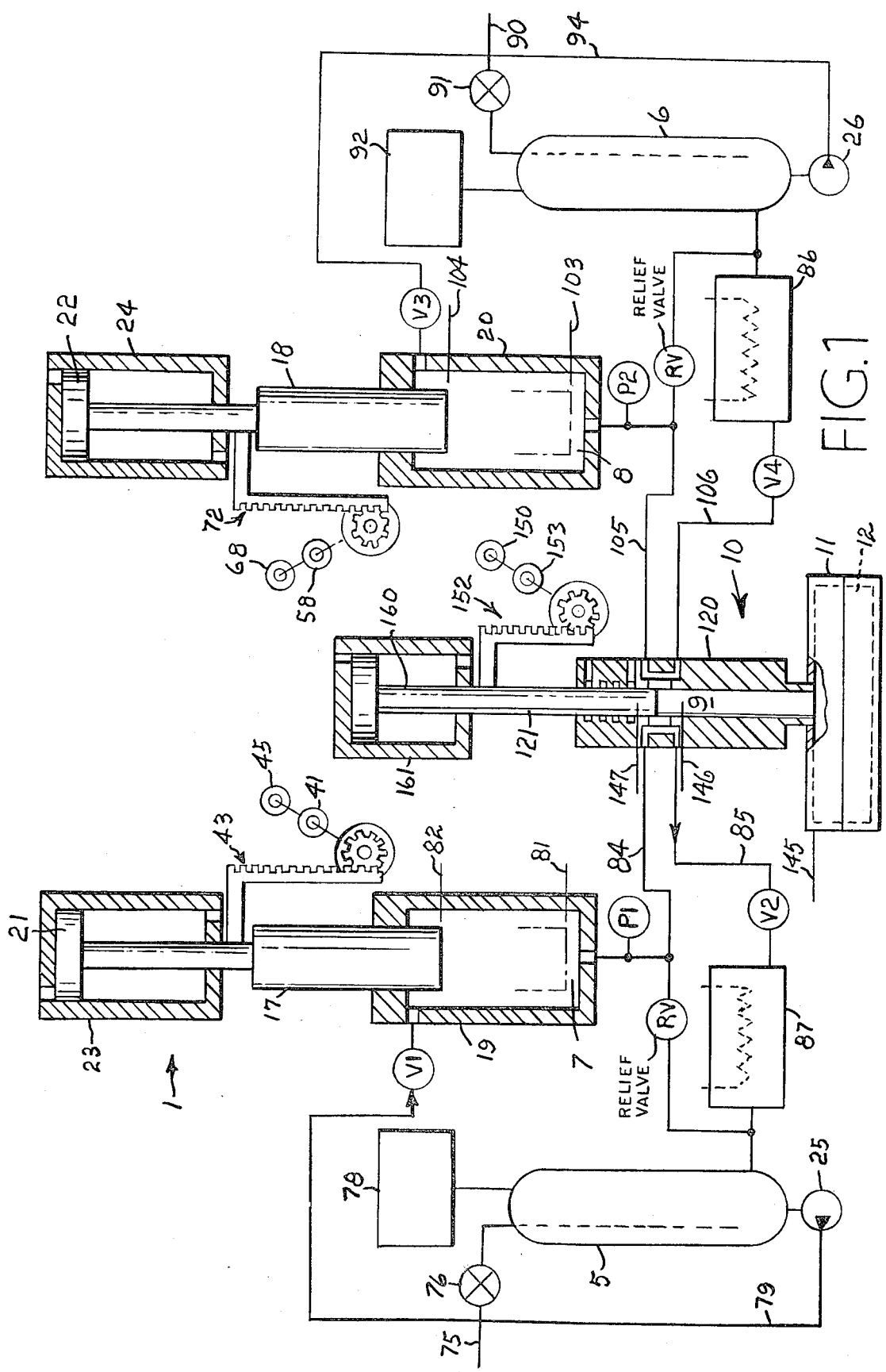

United States Patent [19]

Peter

[11] 3,912,234

[45] Oct. 14, 1975

[54] APPARATUS FOR MIXING AND INJECTING LIQUIDS INTO A MOLD

[75] Inventor: John William Peter, Cincinnati, Ohio

[73] Assignee: Cincinnati Milacron, Inc., Cincinnati, Ohio

[22] Filed: Aug. 29, 1974

[21] Appl. No.: 501,668

[52] U.S. Cl. .................................................. 259/4
[51] Int. Cl.² ......................................... B01F 5/06
[58] Field of Search .............. 259/4, 18, 36, 60, 95; 425/200; 137/604, 609; 222/318, 319, 409

[56] References Cited
UNITED STATES PATENTS
3,221,948  12/1965  Kalist .............................. 222/318 X

*Primary Examiner*—Harvey C. Hornsby
*Assistant Examiner*—Alan Cantor
*Attorney, Agent, or Firm*—Daniel P. Worth

[57] ABSTRACT

This invention is concerned with apparatus for intimate mixing of liquids, preferably of liquids that chemically react with each other and which are fed for mixing in a predetermined ratio, and is especially suitable for mixing predetermined ratios of polyol and polyisocyanate liquids followed by injection into a mold of the reacting product in the liquid or foam injection molding of polyurethane articles. The mixer has a housing through which is a bore in which a plunger is mounted for reciprocation. Liquid streams enter the bore from a plurality of axially extending slots arranged peripherally and impinge vigorously on each other. The plunger blocks or unblocks the slots according to a predetermined program and also serves to push the reacting mixture out of the bore and inject it while liquid into a mold. External valving cooperates with the plunger and with positive displacement liquid metering means to direct the liquids in a suitable ratio from their sources to the mixer.

19 Claims, 11 Drawing Figures

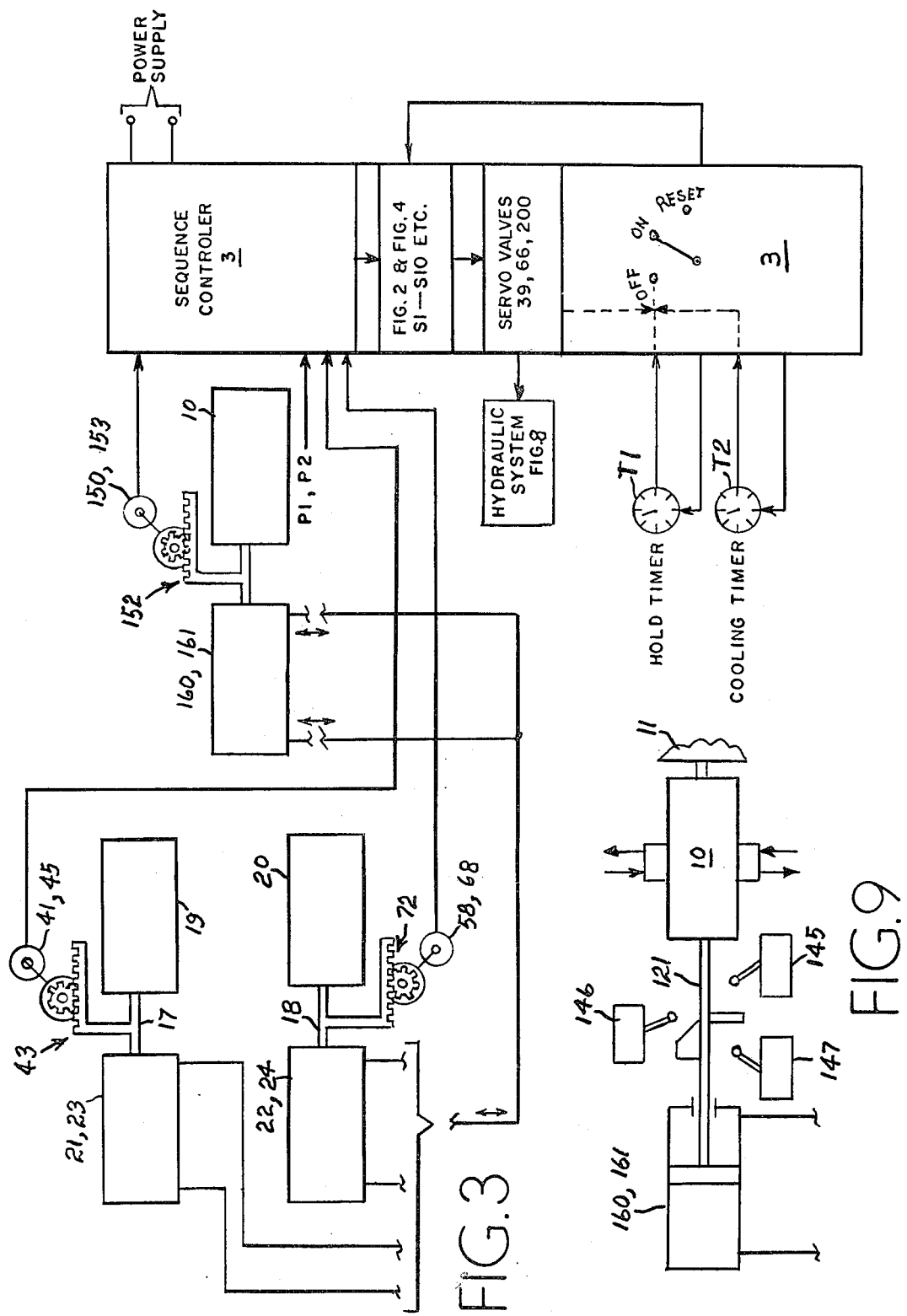

| SYSTEM PARAMETERS | SHOT PREP | PRE-PRESSURIZATION | INJECTION | HOLD | COOLING |
|---|---|---|---|---|---|
| BALL VALVE V1 | OPEN | | CLOSED | | OPEN |
| BALL VALVE V2 | OPEN | | CLOSED | | OPEN |
| BALL VALVE V3 | OPEN | | CLOSED | | OPEN |
| BALL VALVE V4 | OPEN | | CLOSED | | OPEN |
| SHOT POSITION 82 | ON | | OFF | | ON |
| SHOT POSITION 104 | ON | | OFF | | ON |
| INJ. TERMINATION POSITION 81 | OFF | | | ON | OFF |
| INJ. TERMINATION POSITION 103 | OFF | | | ON | OFF |
| MIX VALVE BOTTOM POSITION 145 | OFF | | | ON | OFF |
| MIX VALVE SHOT POSITION 146 | ON | | OFF | | ON |
| MIX VALVE INJ. POSITION 147 | OFF | | ON | | OFF |
| PRESSURE SWI. P1 | OFF | | ON | | OFF |
| PRESSURE SWI. P2 | OFF | | ON | | OFF |
| HOLD TIMER | OFF | | | ON | OFF |
| COOLING TIMER | ON | | OFF | | ON |

FIG.4a

| SYSTEM PARAMETERS | SHOT PREP | PRE-PRESSURIZATION | INJECTION | HOLD | COOLING |
|---|---|---|---|---|---|
| SERVO SWITCH S1 | ON | OFF | | | ON |
| SERVO SWITCH S2 | ON | OFF | | | ON |
| SERVO SWITCH S3 | ON | | | OFF | ON |
| SERVO SWITCH S4A AND S4B | OFF | | ON | OFF | |
| SERVO SWITCH S5 | OFF | ON | | OFF | |
| SERVO SWITCH S6 | OFF | ON | | OFF | |
| SERVO SWITCH S7 | ON | OFF | | | ON |
| SERVO SWITCH S8 | OFF | | ON | OFF | |
| SERVO SWITCH S9 | ON | OFF | | | ON |
| SERVO SWITCH S10 | OFF | | ON | OFF | |

FIG.4b

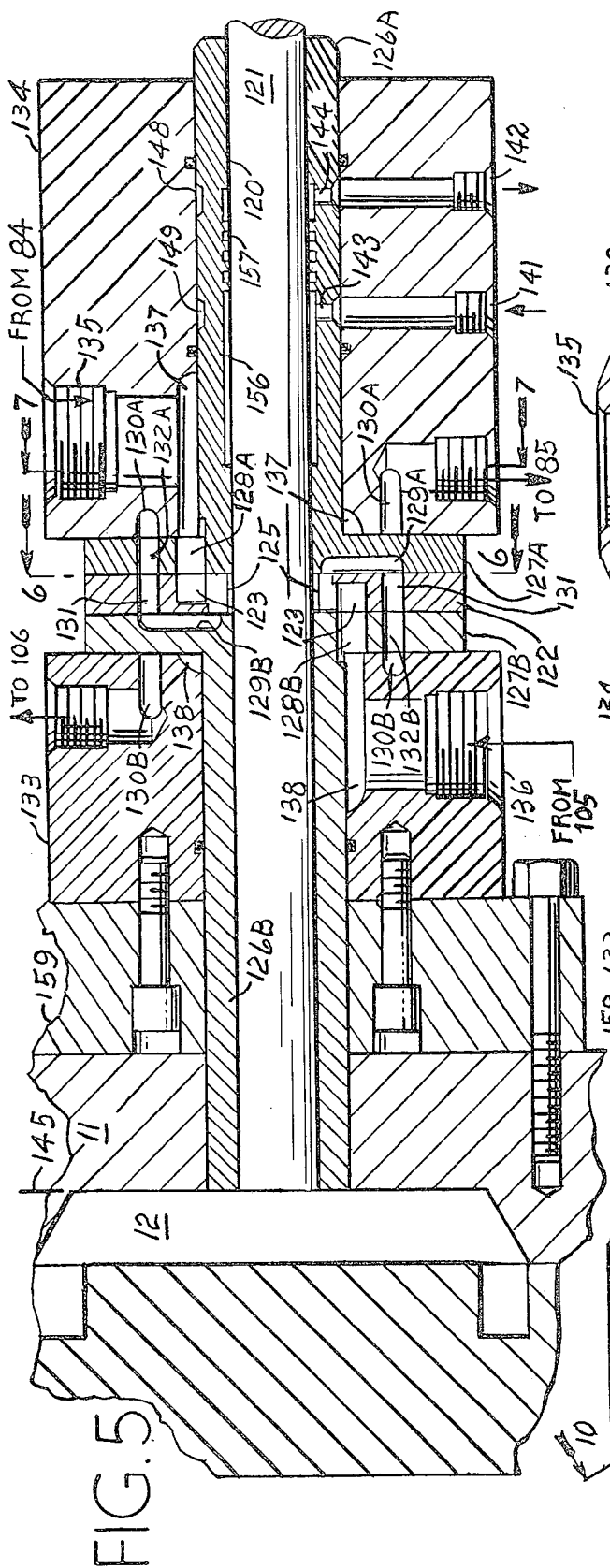
FIG.5
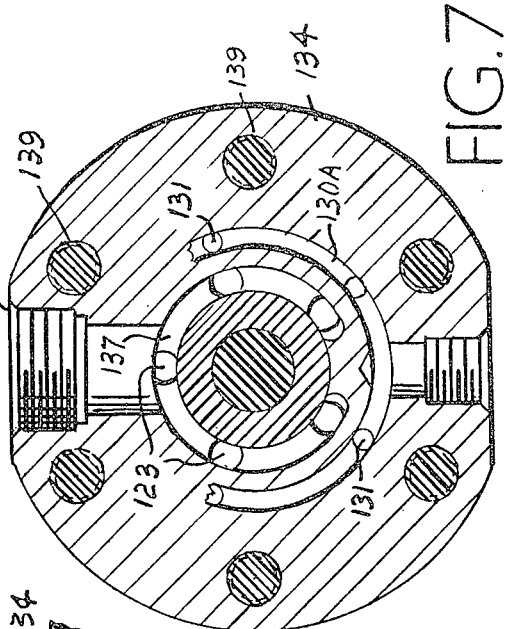
FIG.7
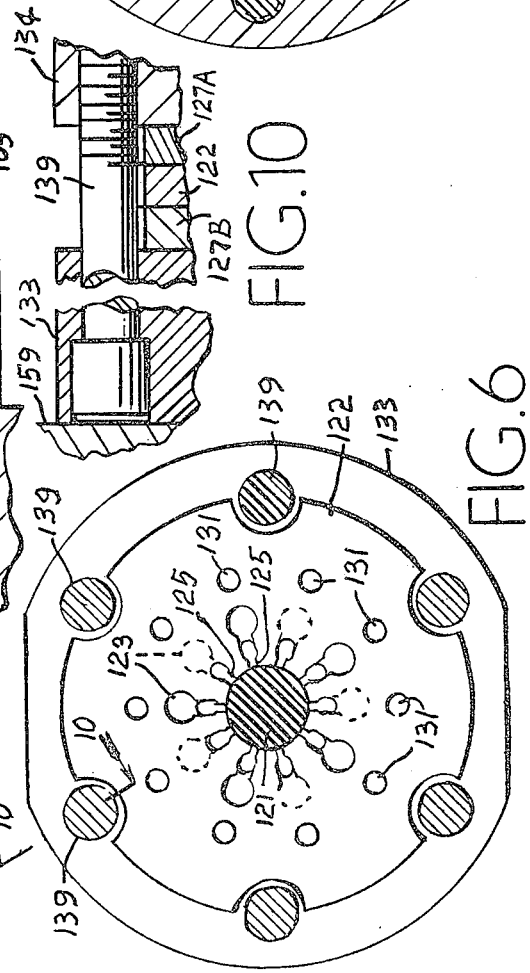
FIG.10
FIG.6

APPARATUS FOR MIXING AND INJECTING LIQUIDS INTO A MOLD

SUMMARY AND BACKGROUND

This invention relates to an improved apparatus for mixing liquids from separate sources. One aspect of the invention relates to a combination of positive displacement feeding means, external valve means, and a mixing and injection molding apparatus all cooperatively arranged. An aspect of the invention concerns an apparatus with inlet and outlet passages in constant communication but with external valving. An aspect relates to a mixing apparatus especially adapted for the intimate mixing of liquids that chemically react with each other such as, for example, such an apparatus adapted for the mixing of polyol and isocyanate to form a thermosettable liquid and then inject same into a mold in connection with which the invention will now be described by way of example but not limitation.

It is known to feed liquids reactable with each other, as in the present example, polyol and polyisocyanate, by systems that operate more or less continuously, or operate on a cyclical batch or injection shot-to-shot basis. It is also known to provide various means to adjust the feed ratio of one or more of the liquids. Many of these means are taught in previously issued U.S. and foreign patents of which the following U.S. Pat. Nos. are representative: 3,386,623 (continuous system); 3,409,174 (batch); 3,410,531 (batch-continuous using a urethane pre-polymer in a plunger-type mixing head); 3,632,022 (plunger mixing chamber with a rubber-like piston for close fit fed by expandable volume plunger chambers; 3,642,175 (mechanical ratio adjustment with mixing enhanced by stirrer 30); and 3,706,515 (batch system with plunger-type mixing head and no external valving).

It is common prior art practice to have a stirrer, impeller or some other mechanical mixing aid present in the mixing chamber. It is also common practice to feed the reagents sequentially into their mixing chamber. It is known to regulate feed ratios, temperature and pressure so that reaction times are slow, or non-stoichiometric ratios are avoided so that the mixture won't solidify before the reaction products reach a mold. These practices generate a number of difficulties such as requiring longer cycle time for molding, difficulties with thermosetting materials by requiring more drastic or longer curing conditions to overcome diluted reagents, etc. A feature and advantage of the instant invention is reduced cycle time while allowing the use of substantially stoichiometric ratios of fast reacting chemicals.

The present invention comprehends an apparatus for mixing liquids and then expelling them from the mixing chamber. Moreover, this is accomplished without the aid of mechanical stirrers, agitators, or the like. Further, all of the valving for the present system is external to the mixing chamber but is operated cooperatively therewith to thereby minimize sealing and leakage problems within the mixing and injecting apparatus itself.

Additionally, the present invention comprehends an apparatus for mixing liquids which are received in a preselected ratio from at least two separate sources. In the preferred embodiment, each source is furnished with a positive displacement liquid feeding means such as a plunger-type metering pump or similar expandable chamber device.

An additional feature of the present invention is its ease of manufacture, a stacked plate type of system being provided so that each liquid has a separate passage to and away from the mixing chamber but enters the mixing chamber as a fine stream that mixes with the other liquid (called jet impingement). A feature of the present invention is that each liquid has a continuously open path of communication within the mixing head from its entrance to its exit, the admission of liquids in the mixing chamber being controlled by a cooperative arrangement of external valving and a plunger that operates within the mixing chambers. Moreover, the plunger serves not only to regulate admission of reagents to the mixing chamber but also to inject same into a mold.

An aspect of the invention relates to an improved system for use in liquid injection molding.

Thus the present invention relates to an apparatus for mixing liquids received from separate sources which apparatus comprises in combination: a housing assembly with a generally centrally located bore extending therethrough; and a plunger fitted into and axially slidable within the bore. Further, the housing assembly further comprises the following elements arranged axially along the bore with the bore passing through each element: a mixing plate having a plurality of axially extending slots located around the bore circumference, a chamber radially outward of each slot, and a first series of holes located on a first radius from the bore axis at least partially through the plate; first radial passage means in one of said elements connecting a first group of selected ones of said chambers with said first holes; a clamping ring with a generally central opening larger than the bore and with first and second substantially radially extending passages through the wall thereof which respectively terminate and connect to a first passage formed peripherally around the central opening at that end of the ring closest to said mixing plate and to a second passage formed as a groove in the same end of the ring radially outward of the first passage; and a flanged sleeve having a tubular body fitted in liquid tight relation with said clamping ring opening and with a radially extending flange at one end of the body in face-to-face engagement between the aforesaid end of the clamping ring and one side of the mixing plate, the flange having a second series of holes each connecting said first passage to said selected chambers in the mixing plate and a third series of holes connecting said clamping ring second passage to said mixing plate 1st series of holes. The apparatus further includes means for holding said elements together; and motor means to move said plunger one direction in said bore by a predetermined stroke sufficiently large to completely mask said slots and to retract said plunger by such stroke large enough to expose a preselected axial portion of said slots.

Figure 2:
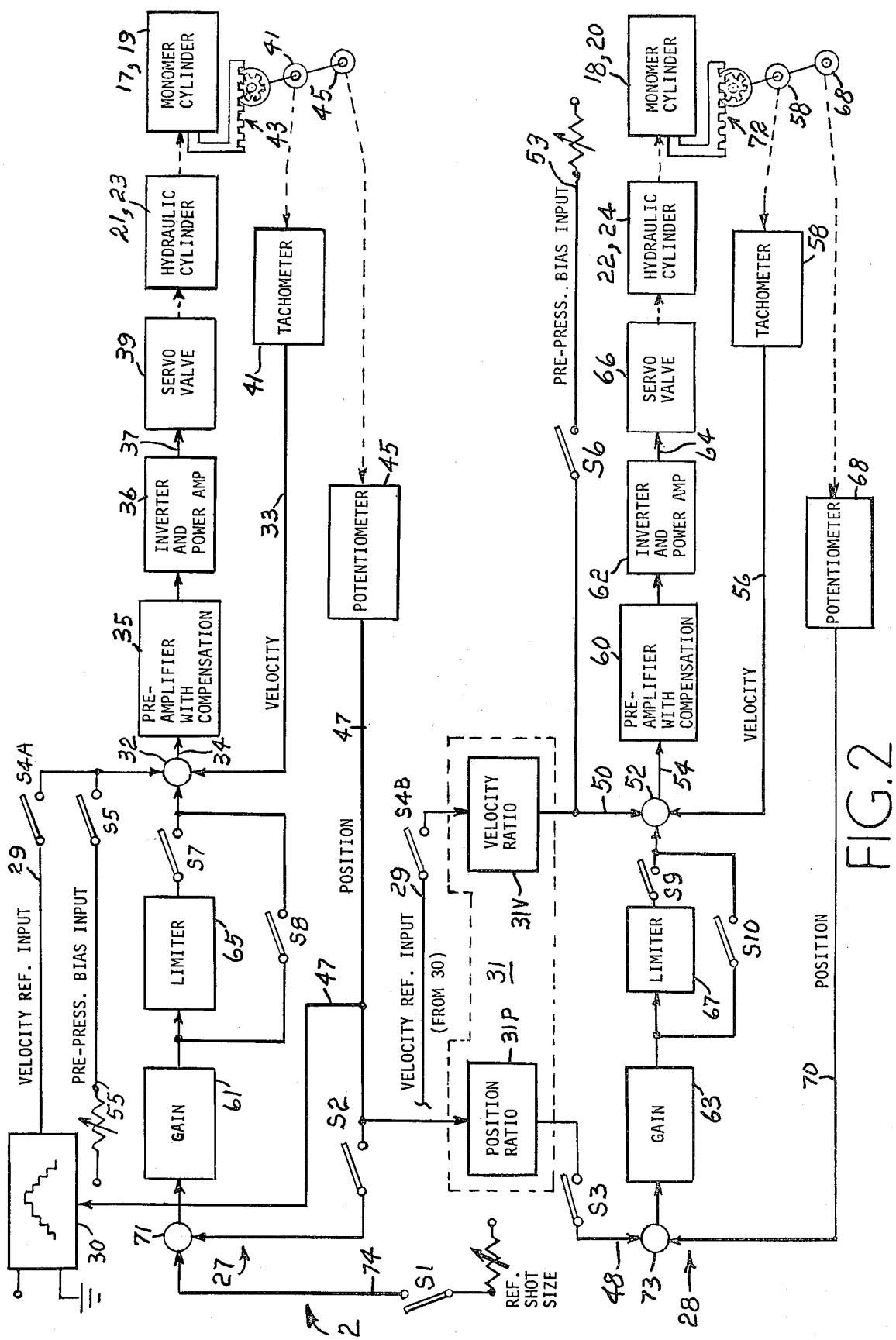

Other objects advantages and features will become apparent from a reading of the following specification in connection with the annexed drawings wherein:

FIG. 1 is a schematic diagram of a preferred overall system for handling and feeding liquids using the present invention;

FIG. 2 is a preferred schematic electrical control diagram explanatory of the adjustable and programmable controlled ratio feeding system as further explained in concurrently filed U.S. Pat. application Ser. No.

Figure 8:
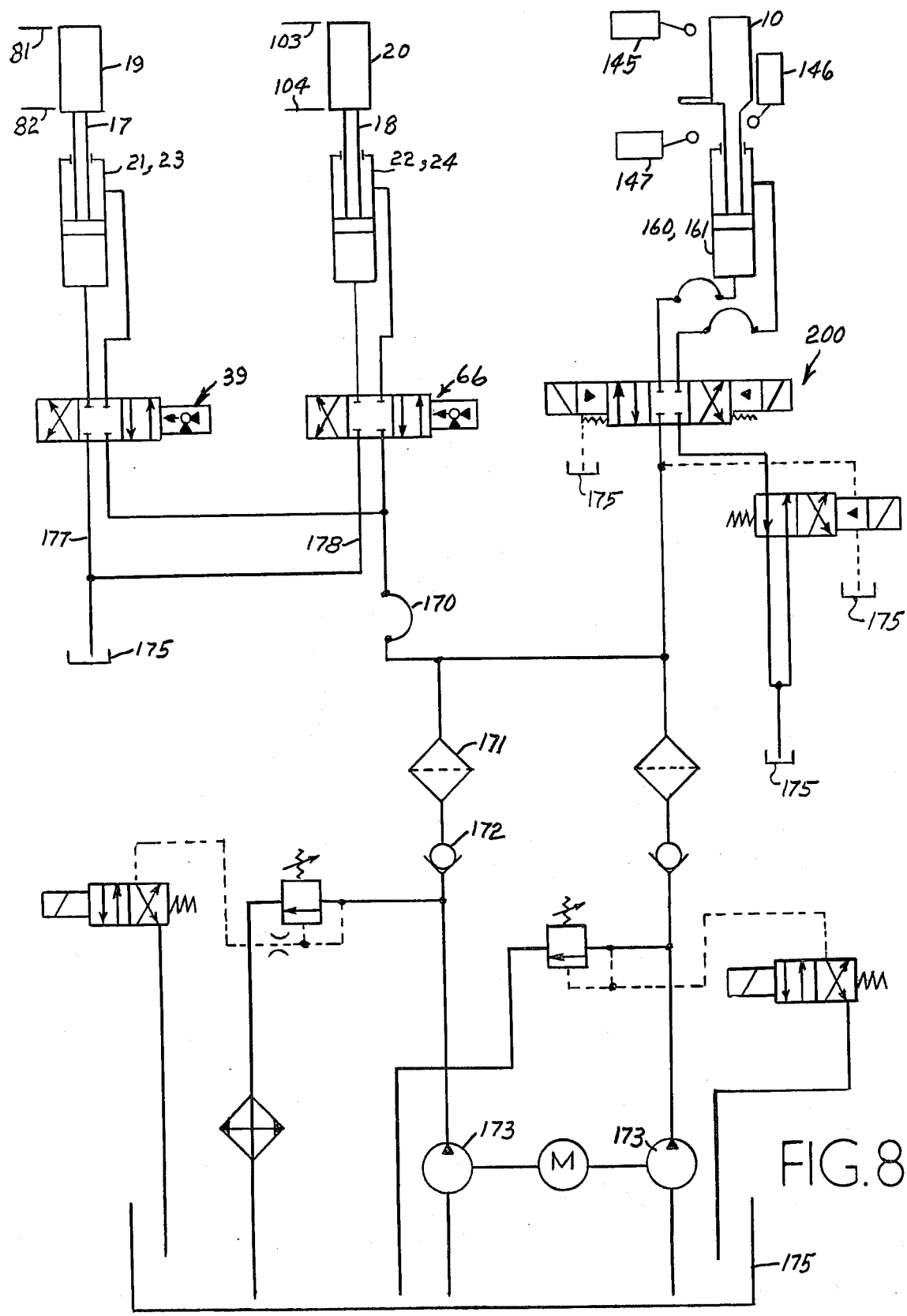

501,743 by Chandra and Scott and assigned to a common assignee;

FIG. 3 is a schematic diagram with elements from all Figs. to illustrate the programmable controller and other automatic controls;

FIG. 4 refers collectively to FIGS. 4a and 4b and is a timing chart explanatory of the operations of the apparatus illustrated schematically in FIGS. 1, 2 and 3;

FIG. 5 is a schematic illustration of the principal features of the mixing head according to the present invention;

FIGS. 6—6 and 7—7 are cross-sections of FIG. 5 along 6—6 and 7—7 respectively;

FIG. 8 schematically illustrates a hydraulic system that is suitable for use with the present system;

FIG. 9 illustrates a modification using limit switches to sense and signal the position of mixing head plunger; and FIG. 10 is a cross section along 10—10 of FIG. 6.

INTRODUCTION

The present system is directed to the system schematically illustrated in FIG. 1 for the metering (especially the feeding in a ratio of reagents to make polyurethane), mixing and injection system 1 of FIG. 1 and particularly to the mixing head of FIGS. 5-7, inclusive. For clarity a preferred automatic control system 2 (FIG. 2) is also illustrated and described. The sequencing of events using the control system 2 and other overall automatic sequencing controls 3 (FIGS. 3 and 4) illustrate and describe preferred use of the present mixing head and the apparatus preferably associated therewith.

The FIG. 1 system feeds isocyanate and polyol from their respective reservoirs 5, 6 to individual metering chambers 7, 8 from whence they are removed to a chamber 9 in a mixing head 10 (constructed according to the present invention) from which the mixture (after or during reaction) is injected directly into a mold 11. The reagents do not contact each other until they enter the mixing chamber 9 but once in the chamber they partially react, and then are injected into the mold 11, cured in well-known fashion, and a thermoset product 12 is then recovered.

The system of FIG. 1 is adapted to what is called liquid injection molding of reagents that are capable of fast reaction such as the polyisocyanate and polyol used to form the polyurethane that is injected into the mold 11. Reaction times in the mixing head 10 and mold 11 to form gels may be on the order of about 3 seconds, the curing time in the mold is on the order of about 2 minutes, and a typical cycle time (per FIG. 3 as the cycle) for molding an article weighing 15 pounds is about 2 minutes. Polyol as used herein means an organic compound containing two or more hydroxyl groups which is liquid under processing conditions and by polyisocyanate is meant an organic composition having two or more isocyanate groups and which is liquid under the processing conditions.

The metering or variable volume chambers 7, 8 of FIG. 1 are controlled by the systems of FIGS. 2-4 to deliver a preselected ratio of reagents e.g., a weight ratio of isocyanate to polyol or polyester. Preferably each metering chamber is a positive displacement liquid feeding means and is constructed to include a plunger or piston 17, 18 operating within a cylinder 19, 20 through a swept volume of preselected but variable or adjustable magnitude. Each plunger preferably is directly driven by a hydraulic piston 21, 22 which is moved within its respective cylinder 23, 24 responsive to the control systems of FIGS. 2 and 3. Preferably a single stroke of each metering plunger 17, 18 in its respective cylinder completely exhausts the reagent therefrom and delivers that quantity of reagent into the mixing chamber 9. Variations in volume are achieved by adjusting the stroke.

The system of FIG. 1 is designed to keep the two reagents e.g. polyisocyanate and polyol, from any contact with each other until they are delivered into the mixing chamber. The reagents are recirculated through the conduit paths described below during those times that they are not being delivered into the respective metering or measuring chambers. Flow is controlled by valves V1–V4 which are external to the mix head 10 while the plunger 121 in the mix head controls admission into chamber 9 hence controls mixing.

The operation sequence including sequential control of the valving of FIG. 1 is manipulated by the control systems of FIGS. 3, 4 and 8 to direct reagents at desired times to certain flow paths and/or to the metering cylinders 7, 8 and to cause delivery from such cylinders into the mixing chamber 9 as will be further explained below. The pumps 25, 26 operate continuously to feed an excess of each liquid to the chambers 7, 8 the excess being recirculated to the reservoirs until such time as the valving and mixing head 10 are operated to shut off recirculation and conduct a mixing and injection program.

The present invention controls the ratio of liquids delivered from the metering chambers 7, 8 of FIG. 1 by using the master-slave control system 2 of FIG. 2. Preferably, the polyisocyanate control system 27 is the master and the polyol control system 28 is the slave. This arrangement can be reversed. The system of FIG. 2 allows both metering plungers 17, 18 to be advanced simultaneously whereby their respective liquids are fed simultaneously to the mixing head 10. However, the velocity or rate at which the liquids are forced out of their respective metering cylinders is programmed in accordance with the velocity desired at each increment of distance that the master (polyisocyanate) metering plunger 17 arrives at. Therefore, it can be said that this is a position coupled programmable velocity controlled ratio injection system for multiple component liquid injection molding.

The control system of FIG. 2 has a programmed velocity means 30 to drive both metering systems in a controlled fashion, but simultaneously. This minimizes or eliminates lag and keeps both plungers 17, 18 approximately in phase during the time they are advancing and expelling liquids. The position coupling and velocity feedback loops, infra, allow slave correction on a lag basis which has been found to be well within acceptable limits, yet the velocity coupling allows both to start and to continue to feed simultaneously.

The Ratio Controlling System of FIG. 2

This section is concerned only with the description of the ratio control system 2 of FIG. 2. Overall operation of the system is described in other sections of this specification. For convenience reference numbers are used for various signals and should also be understood as referring to the transmission means, normally wires for electrical signals and conduits for pneumatic and hydraulic signals.

The operator sets in the following adjustments in the FIG. 2 system: the velocity profile in the programmed velocity means 30 (patch panel) and the two ratios in the ratio controller 31, namely, a position ratio 31P and a velocity ratio 31V. Preferably the velocity profile or program establishes a velocity at each of ten positions of the master plunger 17 during its stroke. This system includes first and second feedback control system means 27, 28 (the master and slave portions) for controlling their respective feeding means 17, 19 and 18, 20. The system of FIG. 2 is enabled only during the time that the plungers 17, 18 in the metering cylinders are advancing and expelling the liquid therefrom. At other times the system of FIG. 2 is disabled. Other automatic control functions of the system as a whole are taken care of by other means as described in FIGS. 1, 3, 4. Similarly, the FIG. 2 system is sequenced by manipulation of the switch means S1-S10 which are in turn enabled at the proper times by means described in connection with FIGS. 1, 3 and 4.

The output signal 29 from the patch panel 30 is a reference velocity that is fed forward to the summing junction 32 for the master feedback control system 27 and is also applied to velocity input terminal of the ratio velocity controller 31V. Summing junction 32 is part of the velocity feed-back system and as is well-known algebraically sums signals applied thereto, in this case sums the reference and feedback velocity signals 29, 33, respectively, to provide a control signal 34 which is then fed forward through a preamplifier 35 and power amplifier 36 means as control signal 37 to a servo-valve 39 controlling the hydraulic fluid admitted to the hydraulic cylinder 23 driving the polyisocyanate plunger 17 of FIG. 1.

The signal 33 representing feedback velocity may advantageously be obtained in well-known fashion by a means for measuring the rate of liquid feeding such as by an electric tachometer 41 driven off the rack and pinion system 43 secured to the plunger 17. The rack and pinion 43 also drives position sensor, potentiometer 45 that provides feedback position signal 47.

Each of the ratio controller 31 parts 31P, 31V is a computing amplifier designed for multiplying operations.

The master servo-system also has a position interlock which applies a feedback signal 47 representing master cylinder plunger position to the position input of the ratio controller 31P and to the patch panel 30 — the latter so that master velocity is correlated with the position of the plunger.

The slave system 28 of FIG. 2 is operated from two input signals consisting (1) of a position locking input signal 48 obtained from the ratio controller 31P and representative of the product of — polyisocyanate/polyol ratio (which is manually set in) times master plunger position representative signal 47: and (2) velocity representative signal 50 from 31V representing the product of — reference velocith 29 (from patch panel 30) times (polyisocyanate/polyol) ratio which produces the slave velocity feed forward input signal 50 which is fed to the summing junction 52 for the slave velocity feedback loop located on the input end of the slave control system.

A bias input voltages 53, 55 from a power supply provide bias voltage to their respective summing junctions 52, 32 during the prepressurizing and injection phases of the cycle (FIGS. 2, 4). Their purpose is to cause slow initial advance of the metering plungers 17, 18 so that pressure builds up in the lines leading from the metering cylinders to the mixing cylinder. The pressure builds up until pressure switches P1 and P2 turn off (FIGS. 1, 4) which event signals the end of prepressurizing and initiates the actual injection. The bias voltages are applied to the system by closing switches S5 and S6 during the prepressurizing and injection steps: S5 and S6 are open at other times. During the injection step switch S4 is closed to apply the velocity reference input to the system.

A slave velocity feedback signal 56 from the slave electric tachometer 58 is applied to the feedback summing junction 52 and the control signal 54 obtained by summing the inputs thereto is applied through suitable preamplifying and power amplifying means 60, 62, respectively as control signal 64 to the hydraulic servo-valve 66 for regulating the advance of the slave metering plunger 18.

The slave system 28 has a plunger position potentiometer 68 that generates signal 70 representing slave plunger position. Gain controls 61, 63 and limiter 65, 67 in each of the master and slave loops, respectively, receive signals from position feedback summing junctions 71, 73. A shot size reference 74 is connectable to the summing junction 71 by switch means S1.

The velocity feedback signals for the FIG. 2 system are obtained preferably by liquid feed rate measuring means such as electric tachometers 41, 58 which are respectively associated with rack and pinion drives 43, 72 on the hydraulically driven metering plungers controlled by the FIG. 2 system. In similar and well-known fashion, potentiometers 45, 68 are each a distance measuring means driven by their respective rack and pinions to provide the requisite position feedback signals. These velocity and position signals are also used in the sequencing control system of FIG. 3 to manipulate switches S1–S10 and to start and stop the advance and retraction of the respective metering plungers as will be described elsewhere herein.

Supply, Metering, Valving and Mixing

FIG. 1 schematically illustrates the system 1 for feeding, metering, valving (note especially ball valves V1–V4 and pressure switches P1, P2) for controlling and mixing liquids; where the system is for making polyurethane, polyisocyanate (or in some cases prepolymer urethane, the other ingredient then being a catalyst and, if needed, additional amounts of reagent for stoichiometric balance) is fed into the master and slave reservoirs 5, 6 through respective supply lines 75, 90 and supply valves 76, 91 from an suitable source such as a tank car, etc. The reservoirs 5, 6 are each furnished with a supplemental pressurizing source 78, 92 such as inert gas pressure of about 3–5 psig. (sufficient to keep out air) from suitable source such as pressurized gas bottles, liquid nitrogen and vaporizer and pump, or the like.

The master metering cylinder system 17, 19 and the slave meter 18, 20 are preferably of the so-called lance design comprising a plunger that moves within a cylinder and has a substantial annular space, far greater than mechanical clearances, between the plunger and cylinder wall. Displacement from each cylinder is thus directly proportional to the volume displaced by the plunger when it is driven further into the cylinder or withdrawn from the cylinder. Furthermore, the plunger does not act to shut off the flow of liquids into the cylinders 19, 20 although the valves V1–V4 are manipulated in the system to shut off flow through the respective metering cylinders at certain predetermined times.

In the master and slave metering systems respective pumps 25, 26 deliver liquid isocyanate and polyol from the respective reservoirs 5, 6 into feed lines 79, 94 which contain valves V1 and V3. As explained below, the valves V1 and V3 are operated in unison with V2 and V4 and are closed when it is desired to prevent any liquid from entering their respective cylinders and are open at those times when liquid is to be pumped through the respective cylinders. In this manner, there is continuous circulation of the respective liquids through their respective metering cylinders and circuit except for those specific times when valves V1 and V3 are closed. Normally, valves V1 and V3 are closed when the system is undergoing prepressurization and injection but are open during shot preparation and cooling phases. This is shown in FIGS. 4A, 4B which illustrate the timing of the various events including V1 and V3.

Liquid, upon leaving each metering cylinder (which occurs as each plunger is driven from its illustrated retracted position at 82, 104 toward its extended position 81, 103) enters a mixing head feed line 84, 105 which each include a pressure switch P1, P2 respectively.

Each line 84, 105 directs liquid from its respective metering cylinder to the mixing head 10.

One of two events takes place at the mixing head: either the master liquid is directed from the feed line 84 into a mixing chamber 9 for contact with one or more other liquids (e.g. isocyanate is mixed with polyol) or the control elements prevent mixing and instead recirculate each liquid to its respective liquid reservoir 5, 6 through (for polyisocyanate) a recirculation line 85 that includes therein a control valve V2 (V4 for polyol) which is preferably a ball valve. A heat exchanger 87, (86) to cool the liquid is preferably also located in each recirculation line.

Slave liquid travels from the slave metering cylinder through a mixing head conduit 105 that includes pressure switch P2. As with the master liquid, the slave liquid is directed to one of two paths at the mixing head 10: either into the mixing chamber 9 or into the recirculating conduit which includes recirculation conduit 106 having recirculation control valve V4 and preferably the heat exchanger 86 for cooling the polyol.

It will be appreciated that the pumps 25, 26 pump an excess of liquid into their respective chambers 7, 8 until said chambers and conduits connected thereto are filled with liquid. The quantities of material (in chambers 7, 8 represents the volume that will ultimately be displaced when the plungers 17, 18 are advanced and which, therefore, are the quantities fed into the mixing head 10.

The Mixing Head Construction (FIGS. 5–7)

FIGS. 1, 5, 6 and 7 show a preferably all metal mixing head 10 with a housing assembly having a stacked plate construction wherein a number of annular elements having plate-like portions are clamped together in such a fashion as to form a preferably cylindrical bore 120 within which reciprocates in fluid-tight relationship in the mixing chamber plunger 121 which preferably is made of metal. The fit between plunger and bore is such that a seal is effected at the rod end of the housing. The plunger terminates, when fully extended, with its face flush with the mold cavity surface. The instant invention does not include the control apparatus of FIGS. 2, 3, 4. Additional details of construction and usage of the FIGS. 2-4 control system are in the commonly assigned and concurrently executed and filed Application Ser. No. 501,743 by Chandra et al supra The mixing head includes a housing assembly having a mixing plate 122 consisting of a flat annular member with a hole through the middle representing the bore 120 around which are equidistantly spaced a plurality of liquid chambers 123 alternate ones (in the case of two liquids) of which connect to feedlines for different liquids, e.g. one group of chambers connects to polyol and another group to isocyanate feedlines. Each chamber communicates with the bore through an axially extending slot 125.

The slots 125 achieve a jet impingement, i.e. the material impinges on the stream from neighboring slots.

On each side of the mixing plate is a flanged manifold sleeve 126A, 126B each of which sleeves has a flanged portion 127A, 127B with a plurality of holes 128A, 128B therein to respectively communicate with alternate ones of said chambers 123. Each flanged sleeve 126A – 126B communicates with a different group of chambers 123 through these holes or passageways. Radial grooves 129A, 129B in each flange direct liquid from those chambers 123 that connect respectively from the holes 128B, 128A through correspondingly patterned and/or selected holes 131 in the mixing plate and 132B, 132A in the other flange 127B, 127A, respectively, to a manifold groove 130B, 130A in the respective clamping rings 133, 134 which grooves preferably are of varying depth for pressure drop reasons and which in turn are connected to the recirculation line 85, 106 for each liquid.

The feed path for each liquid from the respective feed lines 84, 105 enters through radial inlet ports 135, 136 in the clamping rings 134, 133. The liquids when recirculating leave through radial exit ports designated as connected to recirculation lines 85, 106 respectively. The tapered or varying depth annular grooves 130A, 130B are formed on the inside of each clamping ring to form a fluid tight passage with the flanged sleeve. Each clamping ring 134, 133 has adjacent the flanges 127A, 127B, a bore or central opening 137, 138 each preferably of varying depth along part but not all of the length of the ring to receive the tubular, preferably, cylindrical, sleeve part of 126A, 126B in fluid tight relation. A plurality of bolts 139 secure the assembly together.

Thus, one flow path is 84–135–137–128A–123–12–9B–131–132A–130A–85 and the other flow path is 10–5–136–138–128B–123–129A–131–132B–130B–106.

A plunger lubricant flow system is provided in the upstream end of the clamping ring 134 which has a threaded inlet connection 141 and a threaded outlet connection 142. The respective inlet and outlet connections in the clamping ring are aligned with corresponding passageways 143, 144 formed through the sleeve portion 126A of the flanged sleeve. The respective inlet and outlet passages 143 and 144 terminate in distribution grooves 148, 149 on the face or outside diameter of the sleeve 126A.

Clearance for plunger lubricant solvent (in grooves 148, 149) between the plunger 121 and the inside diameter of the cylinder is provided at 156 and 157. The clearance 156 is sufficient to allow a lubricant or combination lubricant — solvent such as dioxylphthalate (DOP) to be circulated therethrough while travelling between the inlet 141 and outlet 142. At 157 is shown a helical or thread-like passage extending between the inlet and outlet. Alternatively, the helical passage may be omitted and a clearance cut similar to 156. In operation the DOP is directed into the inlet 141, through the clearance and helical passageways 156, 157 thence to the outlet 142. Axial motion of the plunger 121 while lubricant is flowing will contact most of the surface of the plunger with the lubricant. Preferably a typical closed loop lubricant circulation system is connected to the inlet and outlet consisting of a reservoir, pump and suitable lines connecting same to the inlet and outlet 141, 142. The mixing head 10 is secured to the mold 11 by a mounting plate 159. Bolts of the Allen head type secure the plate 159 to the clamping ring 133 and are located in recessed fashion within counterbored holes, as shown in FIG. 5.

Operation and Automatic Controls

Referring first to FIGS. 1 and 3, the reader's attention is drawn to the following important control elements: control valves V1–V4; position indicating potentiometers 45, 68, 150 on the respective metering cylinders and the mixing cylinder; and the positions for the metering plungers 81, 82, and 103, 104 which are indicated by signals off potentiometers 45, 68; the mixing head potentiometer positions shown as bottom 145, preinjection 146 and mixing 147; pressure switches P1 and P2; and in FIGS. 3 hold timer T1 and cooling timer T2. These in addition to the ratio control system of FIG. 2. All of these potentiometers (for position or distance) and likewise electrical tachometers 41, 58 and (mixing plunger) 153 are driven off rack and pinions 43, 72, 152.

The timing chart of FIG. 4 shows when these various elements are enabled and disabled.

The plunger 121 has three positions indicated as 145, 146, 147 which respectively indicate first, slot blocking but fully advanced; second, partially retracted and still blocking the mixing slots; and third, fully retracted unblocking the mixing plate slots 125 to permit mixing. These three positions are controlled by the automatic control system of FIGS. 3 and 4 or 9 explained below.

It should be understood that the several respective key potentiometer positions 81–147 inclusive can be realized by proximity or limit switches (FIG. 9) as well as by potentiometers. Potentiometers are preferred for the metering cylinders because they are rugged and because rack and pinion driven potentiometers as illustrated are readily available commercial items for such usage at the present state of injection molding machine art. Limit switches 145, 146 and 147 as in FIG. 9 are preferred because only a few positions need to be determined.

The velocity signals required for the FIG. 2 system can be realized either from electric tachometers driven in unison with the position potentiometers or by computing from distance and time measurements.

The overall sequence has five major routines as further outlined on FIG. 4: shot preparation; prepressurization; injection; hold or pack; and cooling. This overall sequence as well as the sub-routines involved in each of the major operations is controlled by the sequence controller 3 illustrated schematically in FIG. 3. The sequence controller 3 may be of any commercially available type such as Modicon Programmable Controller Model No. 184-1 manufactured by the Modicon Corporation of Andover, Mass.

When the controller 3 is energized by turning it on, it starts up the chemical and hydraulic pumps 25, 26 (FIG. 1) and 173 (FIG. 8) and initiates the shot preparation routine by closing switch S1 (FIG. 2) and applying a reference signal representing a preselected shot size to the position feedback summing junction 71 (FIG. 2). However, switch S2 is opened at this time and remains that way until the end of the shot preparation at which time it is closed. Note that the switch S2 has two sets of terminals and contact arms thereby to control signals applied to the velocity feedback summing junction 32 and the master cylinder position feedback summing junction 71. Position ratio switch S3 is closed at this time so that position signal 48 can flow from the ratio means 31P to the slave position summing junction 73. The various solenoid ball valves V1 through V4 are open at this time.

Servovalves 39, 66, and solenoid valve 200 (FIGS. 2, 8) control, respectively, the hydraulic fluid flow to the hydraulic piston and cylinder assemblies 21, 23; 22, 24; and the mixing head piston and cylinder 160, 161. The former two are caused to operate so that the master and slave plungers are both retracted fully to the solid line positions 82, 104 as illustrated in FIG. 1. At this time, the mixing head plunger 121 is fully advanced to the position 145 whereby all of the mixing slots 125 are blocked by the plunger and, because the recirculation path through the return ball valves V2, V4 to the reservoirs 5, 6 is open, the fluid flows through them continuously until the end of the shot preparation step at which time the prepressurizing step begins.

Prepressurizing brings the master and slave liquid systems up to certain threshold pressures before mixing and/or injection is allowed to take place. Simply stated, this involves shutting off the recirculation paths by closing valves V1, V2, V3, V4 and then applying enough pressure to the master and slave hydraulic cylinders to drive their plungers forward as hard as possible. During this interval switches S5 and S6 close to provide bias voltage during the pre-pressure step. S4, S8, S9 are open during this step but closed during injection. Meanwhile, pressure switches P1, P2 maintain the system in this pressurized state until respective threshold pressures are reached upstream thereof, thus signifying the master and slave liquids are now up to pressure and ready to be mixed. Prepressurizing also involves partially retracting the mixing head plunger 121 to the position 146: this still blocks the mixing slots but moves the plunger 121 to a position much closer to the slot-unblocking position, whereby an extremely short distance and extremely short time will be required to unblock the slots 125 and initiate mixing.

With the mixing plunger 121 partially retracted and the system under pressure upstream and the pressure switches P1 and P2 sense reaching threshold pressure and signal the end of prepressurizing and beginning of injection: the controller 3 responds to such threshold pressure signals to operate servo-valves 39, 66, and solenoid valve 200 to fully and suddenly retract the mixing plunger 121, which unblocks the slots 125 rapidly and allows the two materials to come out through their slots, mixing intimately in the chamber 9. In the meantime the plungers 17, 18 drive fully and rapidly to their most advanced in positions 81, 103 thereby metering selected volumes into the mixing chamber 9. As indicated on FIG. 4, the ball valves V1–V4 are all closed at this time and the pressure switches P1, P2 have been disabled and will remain that way until the next prepressurizing step.

As can be appreciated, the mixing and injection steps are discussed as one because they involve getting the charges of material out of the master and slave cylinders 7, 8 into the mixing chamber 9 and then removing them from mixing chamber 9 by the rapid advance of the plunger 121 before those chemicals can cure or otherwise solidify. At the end of the mixing operation the controller 3 responds to plungers 17 and 18 reaching their full advanced positions 81, 103 by driving the mixing plunger 121 from full retract 147 to its most advanced position 145 which then signals the controller that the mold cavity 12 has been filled (from the potentiometer 150) and that the injection step has ended.

Position (or limit switch 147 per FIG. 9) 147 can be adjusted to allow only partial uncovering of the slots 123 for small volume shots. Better control in such partial uncovering is realized by using the smallest number of slots consistent with viscosity and cycle time. Slot width should be in the range from about 0.012 inches to about 0.018 inches.

At this time, the hold routine is begun and the hold timer takes over and holds the plunger 121 at substantially that position for a predetermined period of time sufficient to maintain pressure on the reaction product in the mold cavity 12 until the reaction product has solidified.

Then the cooling timer takes over on command of controller 3 to cool the now-molded article sufficiently to allow its removal from the mold and applies cooling water or the like to the mold assembly 11 so that the curing and hardening steps are thereby completed. Also, while the cooling timer is on, the system begins to reset itself by opening the various solenoid ball valves, retracting the metering plungers to positions 82, 104 and maintaining the plunger 121 in its advanced position 145. When the cooling sequence is over, the system is then ready to repeat the shot preparation step, again under the overall guidance of the controller 3.

Ratio Control System Operation

During the injection and holding or packing steps of the system operation, the ratio control system of FIG. 2 operates to advance the metering cylinder plungers 17, 18 in unison to positions 81, 103 and force a quantity from each system into the mixer equal to the swept volume in the respective chambers 7, 8. The mixer 10 contemperaneously begins these steps with its plunger 121 at the mid or short stroke position but is promptly retracted fully to open the mixing slots when the threshold pressures are signalled by pressure switches P1, P2. When the mixing and injection steps begin, the switches S4, S5, S6 are closed and the reference velocity signal is fed forward into the master (isocyanate) feedback control system summing junction 32 and the velocity ratio controller 31V. Reference signals from S4 through the ratio controller 31V begin advancing the slave control metering plunger by actuation of its hydraulic motor (for polyol) 22, 24. In the meantime, of course, the master plunger 17 is advanced. The mixing plunger 121 after both (1) fully retract to position 147 and (2) after the metering plungers fully advance, moves sharply fully forward to 145 thereby to rapidly inject the remainder of mixed material in chamber 9 into the mold. Injection is at this point complete and holding begins.

While both metering plungers move through their strokes, the feedback control systems for each situation feedback their respective velocity signals 33, 56 from the electrical tachometers 41, 58. Corrections of the slave system are made by feeding back from the master system the plunger position or distance signal through the ratio controller 31P to the position summing junction 73 of the slave system.

The manner in which each hydraulic servosystem is manipulated, including the transducing of signals, is wellknown and involves stepping up each electrical signal to a suitable power level, transducing it to a corresponding hydraulic signal in a hydraulic servovalve and regulating the admission of hydraulic liquid into respective hydraulic cylinders for the mixing head as further described below.

The control system of FIG. 2 is reset by opening switches S4A, S4B, S5 and S6 enclosing switches 51, S2, 8, 9, and 10. The various switches, S1-10 preferably are relays.

Hydraulic System

FIG. 8 schematically illustrates the main components of the hydraulic system. The reagent metering cylinders 19, 20 and the mixing head 10 are shown at the top of the FIG. 8 associated with their respective hydraulic cylinder and piston assemblies. In addition, the servovalves 39, 66 for the master and slave systems (see FIG. 2) are illustrated with their hydraulic components in FIG. 8. The servovalves 39, 66 are each three position variable flow valves which receive pressurized hydraulic liquid from a pump line 170 which is fitted with typical components such as filters 171, check valves 172. One or more constant volume supply pumps 173 deliver the liquid into line 170 from the sump or hydraulic liquid reservoir 175. The exhaust lines 177, 178 from or through the respective servo-valves 39, 66 deliver exhaust liquid to the sump 175.

The three positions of the servo-valves 39, 66 are to advance the hydraulic piston, hence the plungers 17, 18 as far as possible to the positions 81, 103; to retract the hydraulic piston, hence the plungers 17, 18 as far as possible to the positions 82, 104; and to hold, by hydraulic means balancing the pressure on each side of the hydraulic piston in well-known fashion, at an intermediate position.

A fourway solenoid valve 200 operates the mixing head 10 by admitting hydraulic liquid to the cylinder thereby moving the plunger thereof to the advanced position 145, to the intermediate position 146, and to the fully retracted and slot-unblocking position 147 in accordance with the sequence laid down by the monitor of FIG. 3.

The operation of the hydraulic system should be self-evident: The pump delivers liquid under pressure to the servovalves at a constant rate of supply. Inasmuch as the servovalves are variable flow, and the pistons are double acting, excess liquid is returned to the sump 175 when the entire quantity is not called for by the position of the various servovalves 39, 66, and solenoid valve 200 and the components that they operate.

The system of FIG. 2 is the control system for servovalves 39, 66 and solenoid 200 and connects them in master-slave fashion. The controller 3 sequences and resets the system.

What is claimed is:

1. An apparatus for mixing liquids received from separate sources which comprises in combination:
    a. a housing assembly with a generally centrally located bore extending therethrough;
    b. a plunger fitted into and axially slidable withinin said bore;
    c. said housing assembly further comprising the following elements arranged axially along the bore with the bore passing through each element:
        i. a mixing plate having a plurality of axially extending slots located around the bore circumference, a chamber radially outward of each slot, and a first series of holes located on a first radius from the bore axis at least partially through said plate;
        ii. first substantially radial passage means in one of said elements connecting a first group of selected ones of said chambers with said first holes;
        iii. a clamping ring with a generally central opening larger than said bore and with first and second substantially radially extending passages therethrough which respectively terminate and connect to a first passage formed peripherally around said central opening at that end of the ring closest to said mixing plate and to a second passage formed as a groove in the same end of the ring radially outward of said first passage said second passage not intersecting said first substantially radial passage; and
        iv. a flanged sleeve having a tubular body through which extends said bore, said body being fitted in liquid tight relation within said clamping ring central opening, and with a radially extending flange at one end of said body in face-to-face engagement between the aforesaid end of the clamping ring and one side of said mixing plate, said flange having a second series of holes each connecting said first passage to said selected chambers in the mixing plate and a third series of holes connecting said clamping ring second passage to said mixing plate first series of holes; and
        v. means holding said elements together; and
        vi. motor means to move said plunger one direction in said bore by a predetermined stroke sufficiently large to completely mask said slots and to retract said plunger by a stroke large enough to expose a preselected axial portion of said slots.

2. A mixing apparatus according to claim 1, further comprising in said housing assembly another clamping ring and another flanged sleeve, said clamping ring having third and fourth generally radially extending passages assembly from the outside of said another clamping ring partly through the wall of said assembly and conduit means in said assembly between said third passage to a second group of said mixing plate chambers and another conduit means in said assembly between said fourth passage and said chambers whereby two separate systems are provided to feed liquids to and from said mixing plate slots by one system that includes said clamping ring first and second passages and another system that includes said third and fourth passages.

3. A mixing apparatus according to claim 1, wherein the housing assembly further includes:
    a. a second clamping ring; and
    b. a second flanged sleeve secured on the other side of said mixing plate with the flange on said sleeve clamped between said second clamping ring and said mixing plate other side;
    c. said second clamping ring having a general central opening larger than said bore and with first and second substantially radially extending passages through the wall thereof for inlet and egress of fluid which passages respectively terminate and connect to a first passage formed peripherally around said central opening at that end of the ring closest to said mixing plate and to a second passage formed as an annular groove in the same end of the ring radially outward of said first passage whereby in the assembly the first passage in each of said clamping rings cooperates with its corresponding flange sleeve to form a continuously open path from its respective radial opening through its corresponding flange sleeve second series of holes to said mixing plate chamber and said second radial passage in each clamping ring forms a continuously open path through said second passage in said ring and to the chamber in said mixing plate through the holes in said mixing plate and the first radial passage means in one of said elements.

4. An apparatus for mixing liquids according to claim 1, wherein said first passage has a cross section that decreases from a maximum where it intersects said first radial passage to a minimum at a point substantially diametrically opposite from said first radial passage.

5. An apparatus in accordance with claim 1, wherein said second passage formed as a groove varies in cross-section from a maximum where it intersects said clamping ring second radial passage to a minimum at a point substantially diametrically opposite therefrom.

6. An apparatus in accordance with claim 1, wherein both said first and second passage have cross-section that decrease from a maximum where they intersect their respective radial passages to a minimum at a point substantially diametrically opposite from such intersection.

7. An apparatus in accordance with claim 3, wherein all of the first and second passages and their respective rings decrease in cross-section from a maximum where such passage intersects its corresponding radial passage to a minimum at a point approximately diametrically opposite from such intersection.

8. Apparatus in accordance with claim 1, wherein said first radial passage means comprises a plurality of radial grooves cut in the face of said flange sleeve at locations such as to connect said first group of chambers with said first hole.

9. A mixing apparatus according to claim 1, having second radial passage means, both said first and second radial passage means being cut respectively in said first and second flange sleeve at location to connect respectively said first group of selected chambers with said first holes and thereby to connect same to said second radial opening in said clamping ring and said second radial passage means connects another selected group of said chambers with another selected group of said first mixing plate hold thereby to connect its respective group to the second radial passage in its respective clamping ring.

10. An apparatus in accordance with claim 1, further comprising a second clamping ring and a second flange sleeve each constructed as above stated for the first said ring and sleeve;
 a. second radial passage means in one of said elements;
 b. both said first and second radially passage means being formed as a radial grooves in the face of respectively the flange on the first said flange sleeve and the flange on said second flange sleeve to connect different groups of said chambers with corresponding different groups in said first series of holes in said mixing plate;
 c. the second passage groove of each clamping ring connecting through corresponding holes in its respective sleeve to the radial slots in the other flange sleeve thereby to form a continuously open passage therethrough.

11. An apparatus for mixing liquids received from separate sources which comprises in combination:
 a. a housing assembly with a generally centrally located bore extending therethrough;
 b. a plunger fitted and axially slidable within said bore;
 c. said housing assembly further comprising the following arranged axially along the bore with the bore passing through each element
  i. a disc-like mixing plate;
  ii. first and second flanges respectively arranged on opposite sides of said mixing plate in face-to-face contact therewith;
  iii. first and second sleeves on which are respectively mounted said first and second flanges and through which said bore passes;
  iv. first and second clamping rings arranged in face-to-face contact with respectively said first and second flanges, each said clamping ring having a generally central opening larger than said bore and surrounding in fluid tight relationship said flange sleeves;
  v. means to secure said stacked plate assembly as aforesaid;
  vi. a first continuously open flow path in each of said clamping rings extending radially inward to its corresponding sleeve through a plurality of parallel openings in the corresponding flange to a first series of chambers located behind said slots in said mixing plate and a second flow path from such group of chambers radially outward on the other flange of the other flange sleeve to a reentrant passageway through said mixing plate and said flange on its corresponding sleeve to an annular groove formed in the first said corresponding flange.

12. An apparatus in accordance with claim 11, further comprising means to axially slide said plunger within said bore.

13. An apparatus in accordance with claim 11, wherein said motor means includes a hydraulic motor with adjustable stroke limiting means to regulate the axial portion of said slots which is exposed during mixing.

14. A system for mixing liquids received from separate sources which comprises in combination:
 a. first and second expanding chamber metering pumps;
 b. a mixing and injecting means;
 c. conduits for feeding liquids from said metering pumps separately into inlet openings of said mixing means;
 d. valve means to admit and cut off respectively the flow of fluids into said metering pumps and from said pumps into said mixing apparatus;
 e. said mixing means further comprising apparatus according to claim 11, with the first said flow path thereof connected to the outlets from one of said pumps; and
 f. said valve means being disposed upstream of both said metering pumps and downstream of said mixing means second flow path.

15. Apparatus in accordance with claim 11, further including an injection mold connected to the end of said housing assembly to receive liquids injected thereinto by advancing said plunger within said bore to a position very close to the runner entrance of said mold.

16. Apparatus for mixing liquids received from separate sources which comprises in combination:
 a. a housing assembly with a generally centrally located bore extendng therethrough; and
 b. a plunger fitted into and axially slidable within said bore;
 c. said housing further having a plurality of passage means arranged therein radially outward of said bore:
  1. a plurality of axially extending slots located around the bore circumference,
  2. a chamber radially outward of and connected to each such slot,
  3. first inlet passage means and first outlet passage means respectively connecting a first group of said chambers through said housing to conduit means external of said housing, and
  4. second inlet passage means and second outlet passage means respectively connecting a second group of said chambers through said housing to fluid supply means external of said housing.

17. Apparatus according to claim 16, for mixing liquids received from separate sources further comprising plunger seal means located in that end of said housing through which said plunger extends, a relieved portion within said seal means providing substantial diametral clearance; and third inlet passage means and third outlet passage means for respectively communicating from outside of said housing to said relieved portion whereby lubricant, solvent, or the like may be supplied through said third passage means.

18. Apparatus according to claim 16, wherein the outermost end of said plunger when the same is fully extended reaches a position flush with the wall of the mold to which said apparatus is attached.

19. Apparatus according to claim 16, further comprising:
 a. a seal means at that end of the housing through which said plunger extends;
 b. a hydraulic piston directly connected to one end of said plunger; and
 c. a hydraulic cylinder surrounding said piston whereby a hydraulic piston and cylinder arrangement is directly axially connected to one end of the plunger.

* * * * *